United States Patent
Fang et al.

(10) Patent No.: US 11,677,306 B2
(45) Date of Patent: Jun. 13, 2023

(54) INDUCTOR CURRENT RECONSTRUCTION CIRCUIT, POWER CONVERTER AND INDUCTOR CURRENT RECONSTRUCTION METHOD THEREOF

(71) Applicant: Silergy Semiconductor Technology (Hangzhou) LTD, Hangzhou (CN)

(72) Inventors: Chiqing Fang, Hangzhou (CN); Zhiwei Xu, Hangzhou (CN); Kaiwei Yao, Hangzhou (CN); Chen Zhao, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 116 days.

(21) Appl. No.: 17/246,844

(22) Filed: May 3, 2021

(65) Prior Publication Data
US 2021/0351687 A1   Nov. 11, 2021

(30) Foreign Application Priority Data
May 7, 2020   (CN) .......................... 202010377704.6

(51) Int. Cl.
*H02M 3/156* (2006.01)
*H02M 1/08* (2006.01)

(52) U.S. Cl.
CPC ............. *H02M 1/08* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 8,278,895 B2 * | 10/2012 | Gardner | H02M 3/156 323/283 |
| 8,581,518 B2 | 11/2013 | Kuang et al. | |
| 9,420,645 B2 * | 8/2016 | Yan | H05B 45/375 |
| 9,543,836 B2 * | 1/2017 | Kurokawa | H02M 1/42 |
| 9,722,506 B2 * | 8/2017 | Pastore | H02M 3/1582 |
| 10,250,135 B2 * | 4/2019 | Yu | H02M 3/156 |
| 10,601,318 B2 * | 3/2020 | Flaibani | H02M 3/158 |
| 2011/0127925 A1 | 6/2011 | Huang et al. | |
| 2017/0318639 A1 | 11/2017 | Wang et al. | |
| 2018/0295685 A1 | 10/2018 | Wang et al. | |
| 2018/0295690 A1 | 10/2018 | Chen et al. | |
| 2018/0310376 A1 | 10/2018 | Huang et al. | |

* cited by examiner

*Primary Examiner* — Jeffrey A Gblende

(57) ABSTRACT

A method of inductor current reconstruction for a power converter can include: acquiring at least one of a current that represents a current flowing through a main power transistor, and a current that represents a current flowing through a rectifier transistor, in order to generate a switching current sampling signal in the power converter; and generating an inductor current reconstruction signal representing an inductor current in one complete switching cycle according to the switching current sampling signal and an inductor voltage signal representing a voltage across an inductor in the power converter.

20 Claims, 8 Drawing Sheets

US 11,677,306 B2

INDUCTOR CURRENT RECONSTRUCTION CIRCUIT, POWER CONVERTER AND INDUCTOR CURRENT RECONSTRUCTION METHOD THEREOF

RELATED APPLICATIONS

This application claims the benefit of Chinese Patent Application No. 202010377704.6, filed on May 7, 2020, which is incorporated herein by reference in its entirety.

FIELD OF THE INVENTION

The present invention generally relates to the field of power electronics, and more particularly to inductor current reconstruction circuits, power converters, and inductor current reconstruction methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching-type power regulators or voltage regulators (VR) are widely used in various electronic systems to provide the constant voltage and current for the load. For most power regulators, the inductor current is detected and reported in real time. When the circuit is in a short-circuit condition, the current flowing through the transistor or other electronic components can be greater than the maximum current limit, such that the power transistors or other electronic components may be damaged. Therefore, the inductor current can be required to be detected in real time. When it is not convenient to directly detect the output current in some applications, information of the output current can be obtained by information of the inductor current in the full switching cycle. Since there are space requirements, integration requirements or other electrical performance limitations in applications of detection of the inductor current in real time, the inductor current or the output current of the power regulators may not be directly detected.

Figure 1:
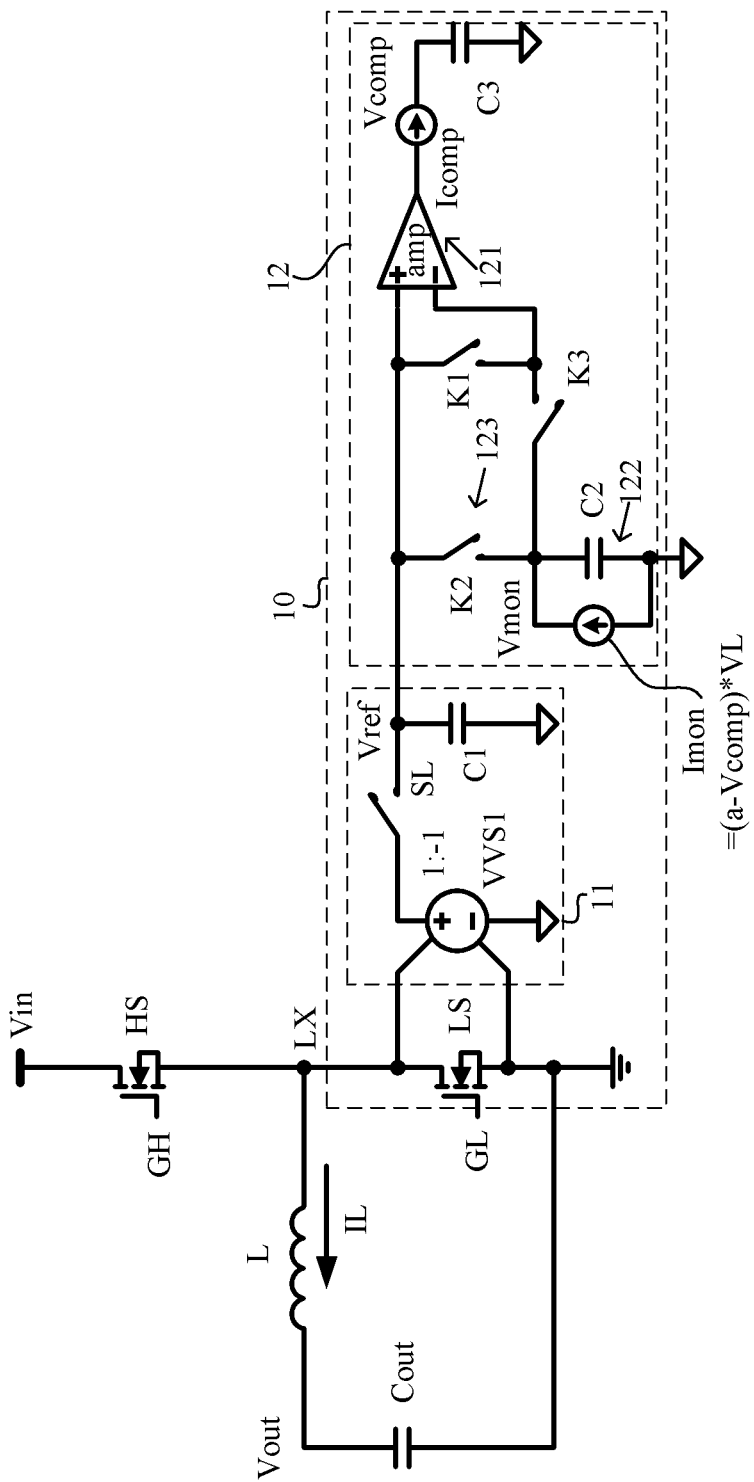
FIG. 1 is a schematic diagram of a first example an inductor current reconstruction circuit, in accordance with embodiments of the present invention.

Referring now to FIG. 1, shown is a schematic diagram of a first example an inductor current reconstruction circuit, in accordance with embodiments of the present invention. In this particular example, the power stage circuit of the power converter can be a Buck topology to illustrate the principle of the inductor current reconstruction circuit. For example, the power stage circuit can include main power switch HS, rectifier switch LS, inductor L, and output capacitor Cout. In particular embodiments, the main power transistor is main power switch HS, and the rectifier transistor is rectifier switch LS. Inductor current reconstruction circuit 10 can include switching current sampling circuit 11, and may generate switching current sampling signal Vref according to at least one of current I1 representing the current flowing through main power transistor HS and current I2 representing the current flowing through rectifier transistor LS in the power converter. Also, inductor current reconstruction circuit 10 can include inductor current generation circuit 12, and may generate inductor current reconstruction signal Vmon representing the waveform of inductor current IL in the complete switching cycle according to switching current sampling signal Vref and inductor voltage signal VL representing the voltage across inductor L, in order to track inductor current IL.

It should be noted that inductor voltage signal VL can be obtained by directly detecting the voltage across inductor L, or indirectly obtained in other indirect detection methods without directly detecting the voltage across inductor L. In particular embodiments, switching current sampling circuit 11 can generate switching current sampling signal Vref by obtaining at least one of the voltage across main power transistor HS and the voltage across rectifier transistor LS.

In particular embodiments, switching current sampling circuit 11 can include voltage-controlled voltage source VVS1, sampling switch SL, and capacitor C1. Voltage-controlled voltage source VVS1 can detect the voltage across rectifier transistor LS, and then generate switching current sampling signal Vref representing the current flowing through rectifier transistor LS and being proportional to the voltage across rectifier transistor LS. Since the transistor has a fixed on-resistor Rdson when the transistor is turned on, the drain-source voltage of the transistor detected can be proportional to the current flowing through the transistor. In addition, because the current flows from the source terminal to the drain terminal of rectifier transistor LS when rectifier transistor LS is turned on, the drain-source voltage of rectifier transistor LS is negative. In order to facilitate the design of the latter circuit, the coefficient of voltage-controlled voltage source VVS1 can be negative such that switching current sampling signal Vref is positive. Here, 1:−1 may be selected as the coefficient of voltage-controlled voltage source VVS1. Those skilled in the art will recognize that the coefficient of voltage-controlled voltage source VVS1 can also be selected with other values in different designs. Moreover, sampling switch SL can be turned on for a period of time when rectifier transistor LS is turned on, such that switch current sampling signal VREF is maintained on capacitor C1.

Further, inductor current generation circuit 12 can include error amplifying circuit 121 that may generate error compensation signal Vcomp according to switching current sampling signal Vref and inductor current reconstruction signal Vmon, reconstruction signal output circuit 122, and switch circuit 123. For example, reconstruction signal output circuit 122 can include current source Imon related to error compensation signal Vcomp, inductor voltage signal VL, and capacitor C2. Reconstruction signal output circuit 122 can selectively receive switching current sampling signal Vref by switch circuit 123, and adjust the output current of current source Imon according to error compensation signal Vcomp and inductor voltage signal VL. Current source Imon can charge and discharge capacitor C2, in order to generate inductor current reconstruction signal Vmon. Thus, the voltage across capacitor C2 is current reconstruction signal Vmon. Here, the change trend of current source Imon may be the same as that of inductor voltage signal VL, and opposite to that of error compensation signal Vcomp. For example, the relationship between current source Imon, inductor voltage signal VL, and error compensation signal Vcomp may meet the following formula: Imon=(a−Vcomp)*VL, where "a" is a constant.

For example, error amplifying circuit 121 can include error amplifier "amp." The non-inverting input terminal of error amplifier amp can connect with the output terminal of switching current sampling signal Vrerf and may receive switching current sampling signal Vref, and the inverting input terminal of error amplifier amp may selectively receive one of switching current sampling signal Vref and inductor current reconstruction signal Vmon by switch circuit 123. For example, optionally, switch circuit 123 can include switch K1 connected between the two input terminals of error amplifier amp, switch K2 connected between the output terminal of switching-current sampling signal Vref and the output terminal of inductor current reconstruction signal Vmon, and switch K3 connected between the output terminal of inductor current reconstructed signal Vmon and the inverting input terminal of error amplifier amp.

In the operation process, when one of the main power transistor and the rectifier transistor is configured as a detected transistor, a current tracking signal can be generated according to the switching current sampling signal in a first time interval of a conduction time interval of the detected transistor. In addition, a current analog signal varying with the inductor current may be generated according to the current tracking signal generated and the inductor voltage signal in at least one part of an off-time(s) interval of the detected transistor. For example, the current tracking signal can be continuous with the current analog signal, and both the current tracking signal and the current analog signal may be configured as parts of the inductor current reconstruction signal.

In the first part of the first time interval of the conduction time interval of the detected transistor, the inductor current reconstruction signal can track the switching current sampling signal in real time by the switch circuit, in order to control the current tracking signal to be consistent with (e.g., the same as) switching current sampling signal. For example, when switches K1 and K3 are turned off and switch K2 is turned on, capacitor C2 can be directly connected to the output terminal of switching current sampling signal Vref, such that the current tracking signal (e.g., inductor current reconstruction signal Vmon in the first part of the first time interval of the conduction time interval of the detected transistor) is consistent with switching current sampling signal Vref.

In the second part of the first time interval of the conduction time interval of the detected transistor, the inductor current reconstruction signal can be coupled to one input terminal of the error amplifying circuit by the switch circuit and the change rate of the current tracking signal (e.g., inductor current reconstruction signal Vmon in the second part of the first interval of the conductive interval of the detected transistor) can be adjusted according to the error between inductor current reconstruction signal Vmon and switching current sampling signal, in order to track the change rate of the inductor current, and thereby adjusting the output current of the controllable current source in the second part of the first time interval of the conduction time interval of the detected transistor. For example, when switches K1 and K2 are turned off and switch K3 is turned on, the error amplifying circuit may receive switching current sampling signal Vref and inductor current reconstruction signal Vmon, and then can generate error compensation signal Vcomp according to switching current sampling signal Vref and inductor current reconstruction signal Vmon, in order to adjust output current Imon. Therefore, the current tracking signal can track switching current sampling signal Vref by a negative feedback adjustment.

In at least one part of an off-time interval of the detected transistor, the output current of the controllable current source may be adjusted to generate the current analog signal consistent with the current tracking signal according to the inductor voltage signal. For example, inductor current reconstruction circuit can include blanking time Tb, and whether main power transistor HS or rectifier transistor LS participate in the generation of inductor current reconstruction signal Vmon may be determined by whether the on-time corresponding to each transistor is greater than blanking time Tb. In particular embodiments, the current tracking signal may not be generated in a second time interval of the conduction time interval of the detected transistor, and the second time interval of the conduction time interval of the detected transistor can include the off-time moment of the detected transistor, where the time length of the second time interval is the conduction time interval of the detected transistor. Optionally, in the second time interval of the conduction time interval of the detected transistor, the current analog signal can be generated.

In particular embodiments, switching-current sampling circuit 11 can detect one of the switching current flowing through main power transistor HS and the switching current flowing through rectifier transistor LS, or detect both the switching current flowing through main power transistor HS and the switching current flowing through rectifier transistor LS. Regardless of whether one transistor is to be detected or two transistors are to be detected, the transistor can be configured as the detected transistor only when the on time of the transistor is greater than the blanking time. In such a case, the current tracking signal can be generated according to the switching current flowing through the detected transistor. Further, the current analog signal can be generated by the current tracking signal, and the current analog signal may be consistent with the current tracking signal.

When only one transistor is detected and the on-time of the transistor is greater than the blacking time in one switching cycle, the current tracking signal may be generated according to the switching current flowing through the detected transistor. In addition, the current analog signal can be generated by the current tracking signal and the current analog signal may be consistent with the current tracking signal.

When both two transistors are detected, at least one of the on-time of the main power transistor and the on-time of the rectifier transistor may be greater than the blanking time in one switching cycle. In such a case, if only one of the on-time of the main power transistor and the on-time of the rectifier transistor is greater than the blanking time is greater than the blanking time, the current analog signal may be generated according to the current flowing through this transistor. In addition, if both the on-times of the two transistors are greater than the blanking time, the current analog signal may be generated according to the current flowing through the main power transistor or the rectifier transistor. In this example, the inductor current reconstruction signal can include the current tracking signal tracking the main power transistor and the current analog signal consistent with the current tracking signal tracking the main power transistor, and another current tracking signal tracking the rectifier transistor and the current analog signal consistent with the another current tracking signal tracking the rectifier transistor in one switching cycle.

Figure 2:
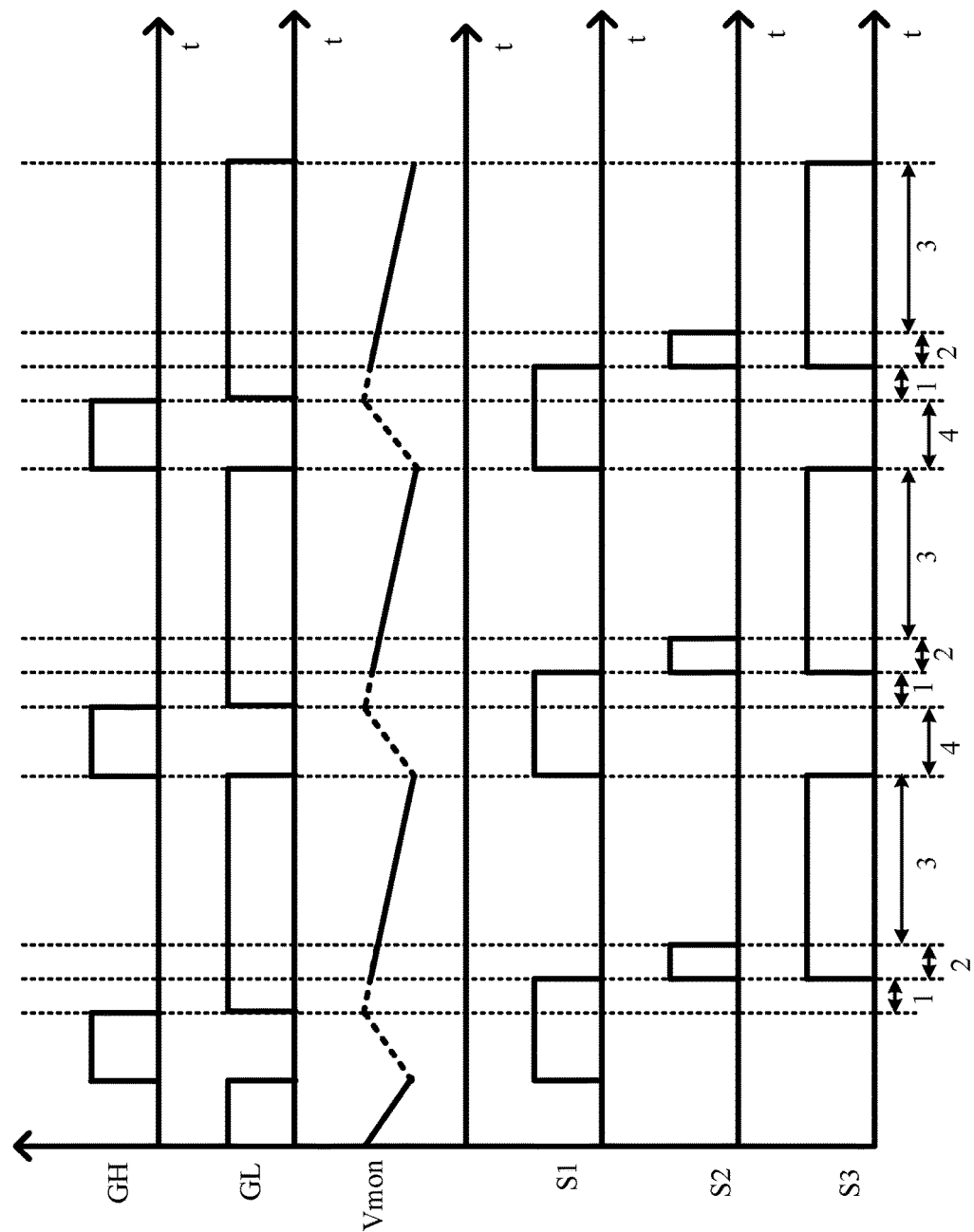
FIG. 2 is a waveform diagram of a first example operation of the inductor current reconstruction circuit, in accordance with embodiments of the present invention.

Referring now to FIG. 2, shown is a waveform diagram of a first example operation of the inductor current reconstruction circuit in accordance with the embodiments of the invention. In particular embodiments, only detecting rectifier transistor LS, which participates in the generation of inductor current reconstruction signal Vmon, is taken as an example to illustrate the reconstruction process of the inductor current during the complete switching cycle. In stage 2, rectifier transistor LS can be turned on. The stage 2 may begin after rectifier transistor LS is turned on for the time length of blanking time Tb, and may end before the turn-off moment of rectifier transistor LS. In stage 2, switches K2 and K3 can be turned on, and switch K1 may be turned off. It can be seen that the output terminal of inductor current reconstruction signal Vmon and switching current sampling signal Vref are short-circuited through switch K2. In such a case, the value of inductor current reconstruction signal Vmon can be equal to or very close to the value of switching-current sampling signal Vref; that is, the starting point of the reconstruction signal Vmon is the same as that of switching current sampling signal Vref.

In stage 3, switches K1 and K2 can be turned off and switch K3 turned on. Inductor current reconstruction signal Vmon can track the switching current flowing through rectifier transistor LS by negative feedback regulation (e.g., inductor current reconstruction signal Vmon tracks switching-current sampling signal Vref). When inductor current reconstruction signal Vmon switches to be greater than switching current sampling signal Vref, error compensation signal Vcomp may decrease such that the output current of current source Imon increases. Since inductor voltage signal VL is negative (e.g., −Vout), the output current of current source Imon can discharge capacitor C2. In such a case, the discharging rate for capacitor C2 may be increased, thereby controlling inductor current reconstruction signal Vmon to be consistent with switching-current sampling signal Vref. In stage 3, inductor current reconstruction signal Vmon may realize the tracking for the switching current flowing through rectifier transistor Ls, and the output current of the current source represents the change rate of the inductor current. That is, the change rate of inductor current reconstruction signal Vmon can be the same as that of switching current sampling signal Vref by negative feedback regulation. It can be seen that inductor current reconstruction signal Vmon (e.g., the current tracking signal in stage 2 and 3) may track switching-current sampling signal Vref in stage 2 and 3 in real time.

In stage 4, main power transistor HS can be turned on, rectifier transistor LS turned off, switches K2 and K3 turned off, and switch K1 turned on. In this case, both the two input terminals of error amplifier amp may receive switching current sampling signal Vref, such that error compensation signal remains the same. Here, inductor voltage signal VL=Vin−Vout, and inductor voltage signal VL is positive. Further, the output current of the voltage-controlled voltage source Imon1=Imon_0*(Vin−Vout)/(Vout). Here, Imon_0 represents the change rate of the inductor current obtained in stage 3. The change rate of the inductor current can be the ratio of the voltage across the inductor to the inductance of the inductor. In stage 3, the voltage across the inductor is Vout and the voltage across the inductor is Vin-Vout in stage 4. Therefore, the output current of the voltage-controlled voltage source Imon1, which represents the change rate of the inductor current, can be obtained by the following formula: Imon_1=Imon_0*(Vin−Vout)/(Vout). The voltage across capacitor C2 can increase with a change rate that is the same as the change rate of the inductor current in stage 4 from the voltage across capacitor C2 at the ending moment of stage 3 until the rectifier transistor is turned on again.

In stage 4, the inductor current can be simulated by the current analog signal without directly obtaining the information of the inductor current. In stage 1, when rectifier transistor LS starts to be turned on, the oscillation on drain-source voltage Vds of rectifier transistor LS can greatly affect the detection result. Therefore, a certain blanking time Tb can be set, and the current signal flowing through rectifier transistor LS can be ignored in this stage.

For example, switch K2 (e.g., the control signal for switch K2 is signal S2) and switch K3 (e.g., the control signal for switch K3 is signal S3) are turned off, and sampling switch SL and switch K1 (e.g., the control signal for switch K1 is signal S1) are turned on. Therefore, the signals received by the input terminals of error amplifier amp are the same, such that the output current of error amplifier amp and error compensation signal Vcomp are zero. In stage 4, the value of inductor voltage signal VL may switch to be −Vout from Vin−vout, and the output current of current source Imon can change to discharge capacitor C2. Therefore, inductor current reconstruction signal Vmon may decrease from the peak value of inductor current reconstruction signal Vmon with a fixed change rate. Moreover, the fixed change rate can be the same as change rate Imon_0 representing the change rate of inductor current IL in stage 3.

As mentioned above, the principle of reconstruction of the inductor current in the complete switching cycle by only detecting the current of one transistor is, in stage 3, the value of inductor voltage signal VL is −Vout, and change rate k3 of the inductor current in stage 3 of the inductor current is (−Vout)/L. Also, in stage 4, the value of inductor voltage signal VL is Vin−Vout, and change rate k4 of the inductor current of the inductor current is (Vin−Vout)/L. Therefore, change rate k4 of the inductor current can be obtained.

In particular embodiments, in stage 2, inductor current reconstruction signal Vmon may be forced to be equal to switching-current sampling signal Vref. In stage 3, the change rate of inductor current reconstruction signal Vmon can be controlled to be equal to that of switching current sampling signal Vref by negative feedback regulation. Moreover, the inductor current reconstruction signal in other stages can be obtained according the relationship between the voltage and the current. Therefore, the waveform of the inductor current in the complete switching cycle can be reconstructed only by detecting the switching current of one transistor.

Figure 3:
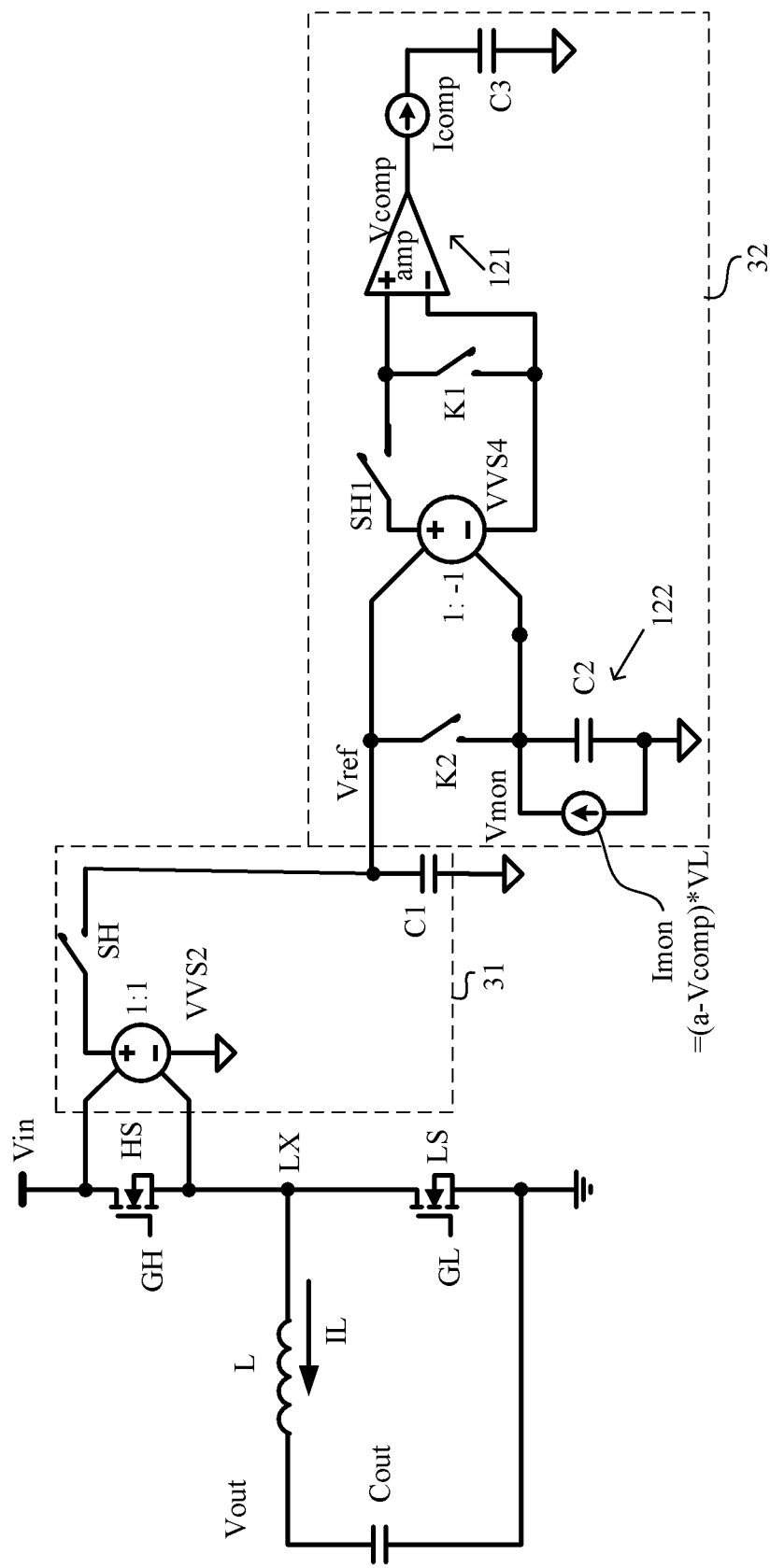
FIG. 3 is a schematic diagram of a second example an inductor current reconstruction circuit, in accordance with embodiments of the present invention.

Referring now to FIG. 3, shown is a schematic diagram of a second example an inductor current reconstruction circuit, in accordance with embodiments of the present invention. In this particular example, switching current sampling circuit 31 may sample the current flowing main power transistor HS, and reconstruction signal output circuit 32 can include voltage-controlled voltage source VVS4 and control switch SH1. Switching-current sampling circuit 31 can include voltage-controlled voltage source VVS2, sampling switch SH, and capacitor C1. Voltage-controlled voltage source VVS2 may detect the drain-source voltage of main power transistor HS, and generate switching-current sampling signal Vref representing the current flowing through main power transistor HS and being proportional to the voltage across main power transistor HS. In this example, since the current flows from the drain terminal to the source terminal of main power transistor HS when main power transistor HS is turned on, the drain-source voltage of main power transistor HS is positive. Therefore, the coefficient of voltage-controlled voltage source VVS1 can be set to be positive, in order to achieve a certain proportional change for the drain-source voltage of main power transistor HS. Here, 1:1 is selected as the coefficient of voltage-controlled voltage source VVS2.

The coefficient of voltage-controlled voltage source VVS2 can also be selected with other values in different designs. Moreover, sampling switch SH can be turned on for a period of time when main power transistor HS is turned on, such that switch current sampling signal VREF is maintained on capacitor C1. In this example, voltage-controlled voltage source VVS4 and control switch SH1 can additionally be applied in reconstruction signal output circuit 32. For example, the output terminals of voltage-controlled voltage source VVS4 can connect between the input terminal of error amplifier amp, and control switch SH1 can connect between one output terminal of voltage-controlled voltage source VVS4 and the non-inverting input terminal of error amplifier amp. For example, sampling switch SH and control switch SH1 can be turned on and off synchronously.

Since the change rate of the inductor current is positive when main power transistor is turned on, and the change rate of the inductor current is negative when rectifier transistor is turned on, the change direction of error compensation signal Vcomp when main power transistor is turned on may be required to be opposite to that of error compensation signal Vcomp when rectifier transistor is turned on. Therefore, the coefficient of voltage-controlled voltage source VVS4 may be required to be negative in this example such that the error amplifier can receive the error signal between the switching current sampling signal and the inductor current reconstruction signal with a different change direction. In this example, optionally, the coefficient of voltage-controlled voltage source VVS4 can be set to be 1:−1. The coefficient of voltage-controlled voltage source VVS4 can also be selected with other values in different designs.

Figure 4:
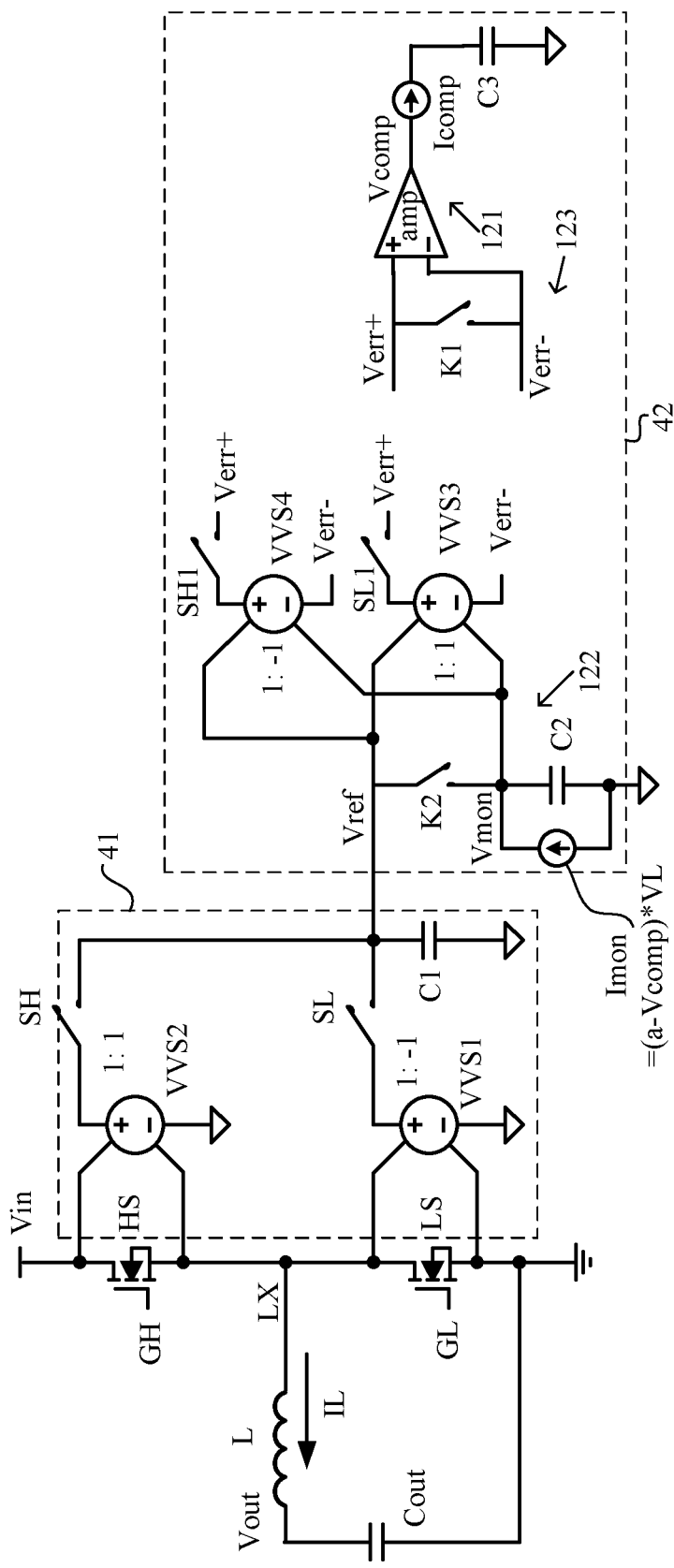
FIG. 4 is a schematic diagram of a third example an inductor current reconstruction circuit, in accordance with embodiments of the present invention.

Referring now to FIG. 4, shown is a schematic diagram of a third example an inductor current reconstruction circuit, in accordance with embodiments of the present invention. In this particular example, switching current sampling circuit 41 may sample the current flowing through main power transistor HS and the current flowing through rectifier transistor LS. In addition, voltage-controlled voltage source VVS4, control switch SH1, voltage source VVS3, and control switch SL1 may be applied in reconstruction signal output circuit 42. Switching current sampling circuit 41 can include voltage-controlled voltage source VVS2, sampling switch SH, voltage-controlled voltage source VVS1, sampling switch SL, and capacitor C1. In this example, voltage-controlled voltage source VVS2 can detect the voltage across main power transistor HS, and switching-current sampling signal Vref representing the current flowing through main power transistor HS when main power transistor HS is turned on may be generated. In addition, voltage-controlled voltage source VVS1 can detect the voltage across rectifier transistor LS, and switching-current sampling signal Vref when rectifier transistor LS is turned on may be generated representing the current flowing through rectifier transistor LS.

In this example, sampling switch SH and control switch SH1 can be turned on and off synchronously, and sampling switch SL and control switch SL1 can be turned on and off synchronously. Since the change rate of the inductor current is positive when main power transistor is turned on, and the change rate of the inductor current is negative when rectifier transistor is turned on, the change direction of error compensation signal Vcomp when main power transistor is turned on may be required to be opposite to that of error compensation signal Vcomp when rectifier transistor is turned on. Therefore, when the coefficient of voltage-controlled voltage source VVS3 is positive, the coefficient of voltage-controlled voltage source VVS4 may be required to be negative such that the error amplifier can receive the error signal with different change directions. In this example, optionally, the coefficient of voltage-controlled voltage source VVS3 can be set to be 1:1, and the coefficient of voltage-controlled voltage source VVS4 can be set to be 1:−1. The coefficients of voltage-controlled voltage source VVS3 and voltage-controlled voltage source VVS4 can also be selected with other values in different designs.

Figure 5:
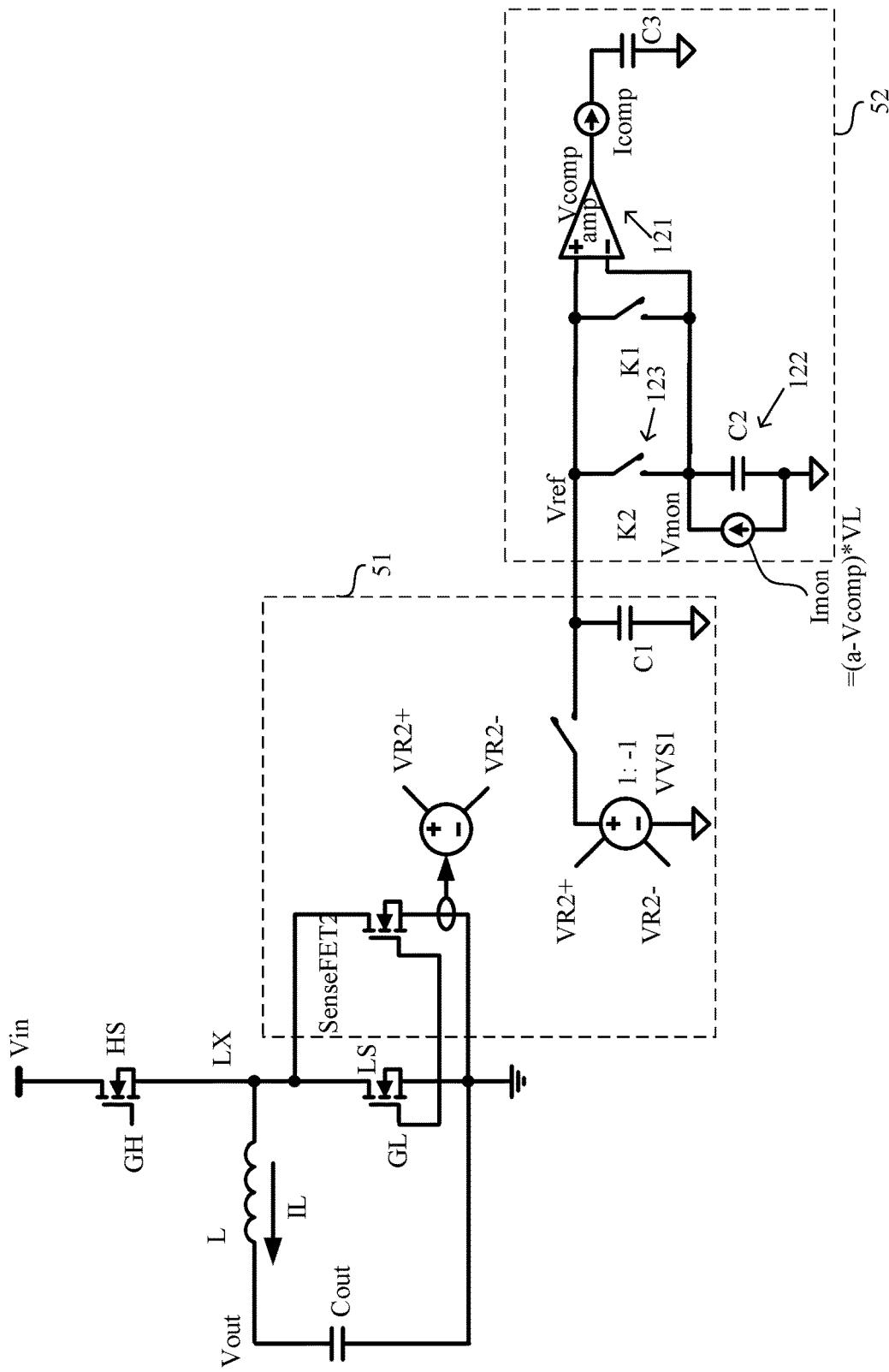
FIG. 5 is a schematic diagram of a fourth example inductor current reconstruction circuit, in accordance with embodiments of the present invention.

Referring now to FIG. 5, shown is a schematic diagram of a fourth example inductor current reconstruction circuit, in accordance with embodiments of the present invention. In this particular example, switching current sampling circuit 51 may sample the current flowing rectifier transistor LS through a current mirror circuit. For example, switching current sampling circuit 51 can obtain the current flowing through rectifier transistor LS through mirror transistor FET2 that shares the source terminal and the gate terminal with rectifier transistor LS, in order to generate switching current sampling signal VREF. In such a case, the current flowing through mirror transistor FET2 may be proportional to the current flowing through rectifier transistor LS. In this example, the current flowing through mirror transistor FET2 can be converted into two voltage signals VR2+ and VR2−.

Voltage-controlled voltage source VVS1 may obtain the voltage signals VR2+ and VR2−, and switching current sampling signal VREF characterizing the current flowing through rectifier transistor LS may be generated by a certain proportion change. In FIGS. 1, 3, and 4, information of the current flowing through the transistors can be obtained by detecting the voltage across the transistors. In this example, information of the current flowing through the transistor can be obtained by the mirror circuit, which can avoid influence of noise and temperature drift of resistance, and can improves the accuracy of the detection result. Moreover, the temperature of the mirror transistor may be close to that of the main power transistor or rectifier transistor, which facilitates compensation.

Figure 6:
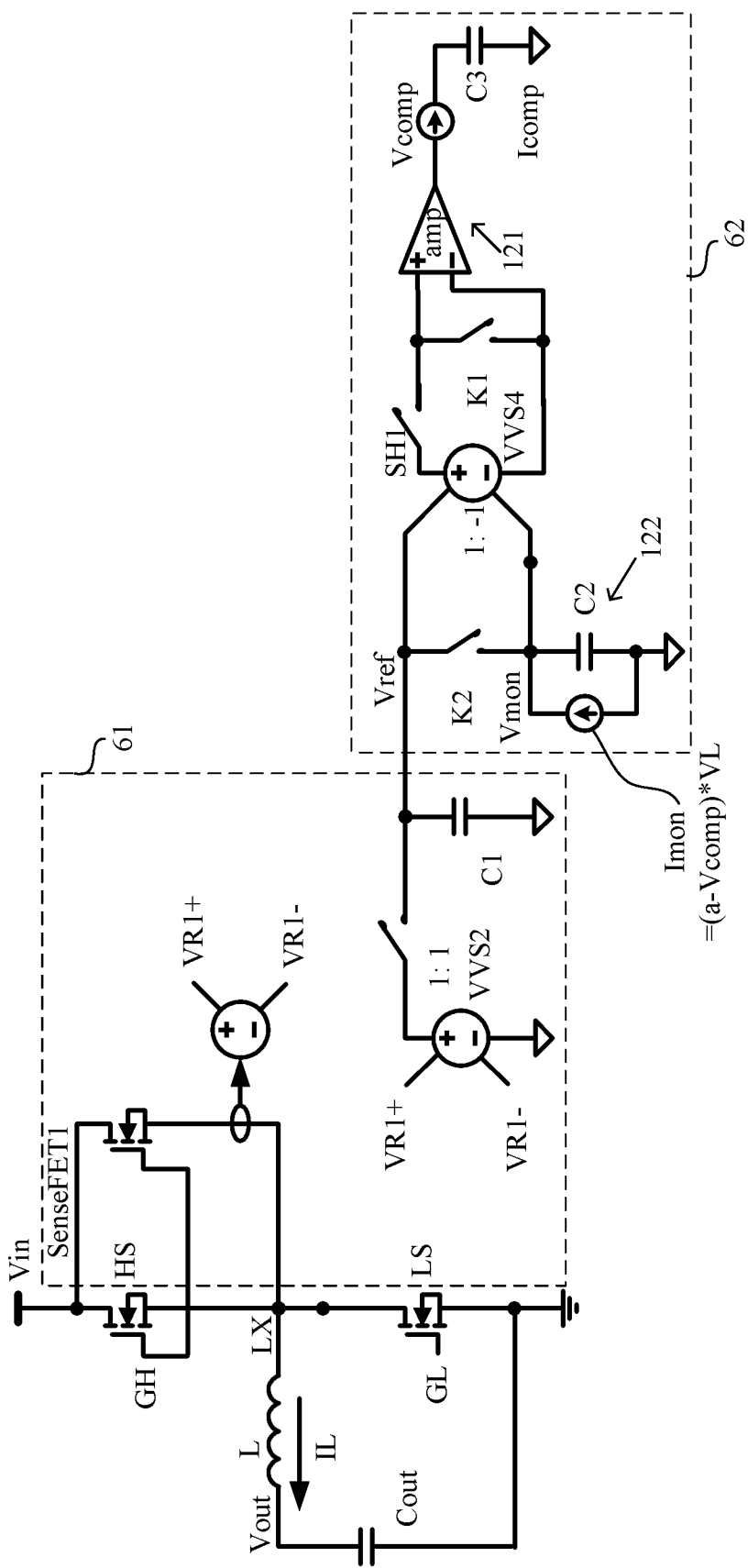
FIG. 6 is a schematic diagram of a fifth example inductor current reconstruction circuit, in accordance with embodiments of the present invention.

Referring now to FIG. 6, shown is a schematic diagram of a fifth example inductor current reconstruction circuit, in accordance with embodiments of the present invention. In this particular example, switching current sampling circuit 61 may sample the current flowing main power transistor HS by a current mirror circuit. For example, switching current sampling circuit 61 can obtain the current flowing through main power transistor HS by mirror transistor FET1, which shares the source terminal and the gate terminal with main power transistor HS, in order to generate the switching current sampling signal VREF. Therefore, the current flowing through mirror transistor FET1 may be proportional to the current flowing through main power transistor HS. In this example, the current flowing through mirror transistor FET1 can be converted into two voltage signals VR1+ and VR1−. Voltage controlled voltage source VVS2 may obtain the voltage signals VR1+ and VR1−, and switching current sampling signal VREF characterizing the current flowing through main power transistor HS can be generated by a certain proportion change.

Figure 7:
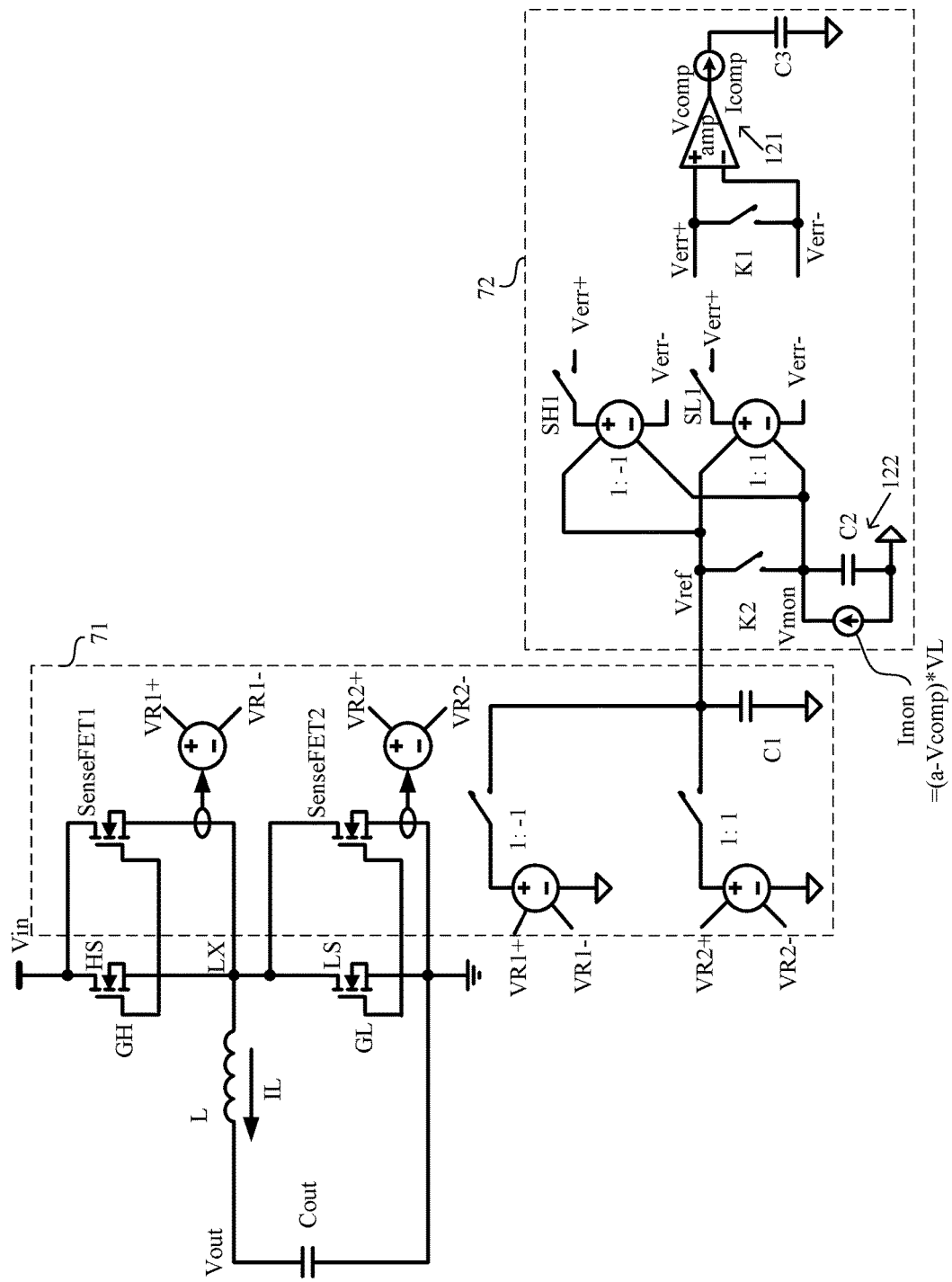
FIG. 7 is a schematic diagram of a sixth example inductor current reconstruction circuit, in accordance with embodiments of the present invention.

Referring now to FIG. 7, shown is a schematic diagram of a sixth example inductor current reconstruction circuit, in accordance with embodiments of the present invention. In this particular example, switching current sampling circuit 71 may sample the current flowing main power transistor HS and rectifier transistor LS by a current mirror circuit. For example, switching current sampling circuit 71 can obtain the current flowing through main power transistor HS by mirror transistor FET1, which shares the source terminal and the gate terminal with main power transistor HS, in order to generate the switching current sampling signal VREF. Also, the current flowing through rectifier transistor HS can be obtained by mirror transistor FET2 that shares the source terminal and the gate terminal with rectifier transistor HS, in order to generate the switching current sampling signal VREF.

Figure 8:
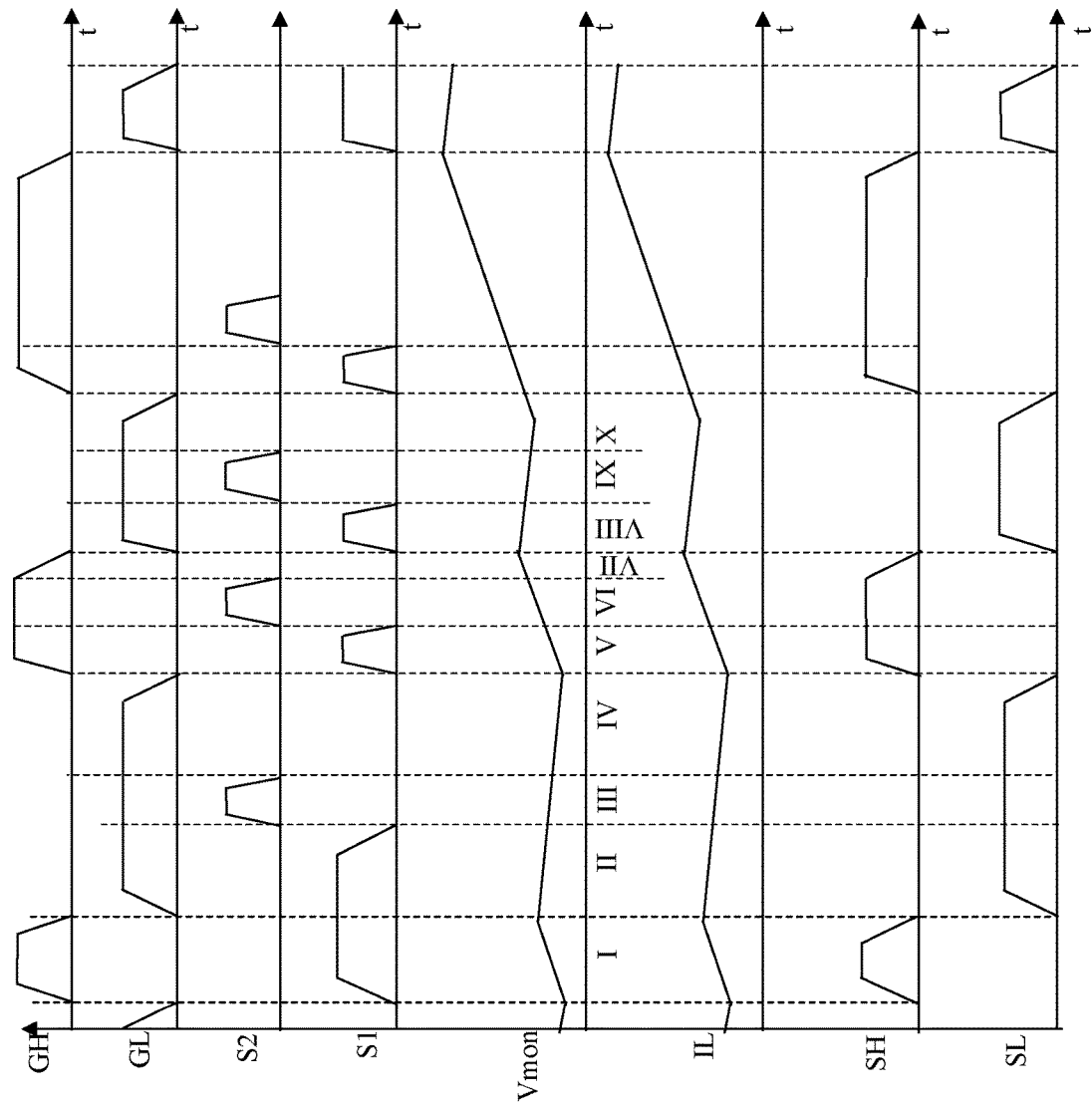
FIG. 8, is a waveform diagram of a second example operation of the inductor current reconstruction circuit, in accordance with embodiments of the present invention.

Referring now to FIG. 8, shown is a waveform diagram of a second example operation of the inductor current reconstruction circuit, in accordance with embodiments of the present invention. Referring also to FIG. 7, both the main power transistor and the rectifier transistor can be set to be the transistors to be detected to obtain the switching current sampling signal. In addition, both the on-time of the main power transistor and the rectifier transistor can be greater than the blanking time. When one of the main power transistor and the rectifier transistor is configured as the detected transistor, the current analog signal may be generated in an interval with the same time length as the blanking time immediately after the first time interval of the detected transistor.

In order to illustrate the form of the inductor current reconstruction signal in one switching cycle, one of the main power transistor and the rectifier transistor can be set to be a "first" transistor and another one of the main power transistor and the rectifier transistor is set to be a "second" transistor. The inductor current reconstruction signal in one switching cycle can include: the current tracking signal in the first time interval of the conduction time interval of a first transistor; the current analog signal in the blanking time of second transistor continuous with the first time interval of the conduction time interval of the first transistor; the current tracking signal in the first time interval of the conduction time interval of the second transistor; and the current analog signal in the blanking time of the first transistor continuous with the first time interval of the conduction time interval of the second transistor.

In interval I, main power transistor HS can be turned on and the on-time of main power transistor HS can be set to be less than the blanking time, such that the sample for main power transistor may not be enabled. In such a case, the input terminals of error amplifier amp can be connected by switch K1, such that the current flowing through main power transistor HS may not participate in the negative feedback adjustment.

In interval II, rectifier transistor LS can be turned on and the time length of interval II is set to be greater than the blanking time, which is similar to the operation process of stage 1 shown in FIG. 2. In such a case, switch K1 can be turned on and the input terminals of error amplifier amp may be connected by switch K1, such that the current flowing through rectifier transistor LS may not participate in the negative feedback adjustment.

In interval III, since the on-time of rectifier transistor LS in interval II has been greater than the blanking time, the current flowing through rectifier transistor LS can participate in the form of the inductor current reconstruction signal in interval III, which is similar to the operation process of stage 2 shown in FIG. 2. In such a case, switch K1 can be turned off and switch K2 turned on, such that the inductor current reconstruction signal is forced to be equal to the switching current sampling signal.

In interval IV, switches K1 and K2 can be turned off and sample switch SL turned on, and the current flowing through rectifier transistor LS can participate in the form of the inductor current reconstruction signal in interval III, which is similar to the operation process of stage 3 shown in FIG. 2. For example, the inductor current reconstruction signal may track the current flowing through rectifier transistor LS. That is, the inductor current reconstruction signal tracks the switching current sampling signal.

In interval V, main power transistor HS can be turned on again and the time length of interval V can be set to be greater than the blanking time. In such a case, switch K1 may be turned on, and the input terminals of error amplifier amp may be connected by switch K1, such that the current flowing through main power transistor HS may not participate in the negative feedback adjustment.

In interval VI, since the on-time of main power transistor HS in interval V has been greater than the blanking time, the current flowing through main power transistor HS can participate the form of the inductor current reconstruction signal in interval main power transistor HS. In such a case, switch K1 can be turned off and switch K2 turned on, such that the inductor current reconstruction signal can be forced to be equal to the switching current sampling signal.

In interval VII, switches K1 and K2 can be turned off and sample switch SH turned on, and the current flowing through main power transistor HS can participate in the form of the inductor current reconstruction signal in interval VII. For example, the inductor current reconstruction signal may track the current flowing through rectifier transistor LS. That is, the inductor current reconstruction signal can track the switching current sampling signal.

In interval VIII, rectifier transistor LS may be turned on again, and the time length of interval VIII can be set to be greater than the blanking time. In such a case, switch K1 can be turned on and the input terminals of error amplifier amp may be connected by switch K1, such that the current flowing through rectifier transistor LS may not participate in the negative feedback adjustment.

In interval IX, since the on-time of rectifier transistor LS in interval VIII has been greater than the blanking time, the current flowing through rectifier transistor LS can participate the form of the inductor current reconstruction signal in interval IX. In such a case, switch K1 can be turned off, and switch K2 turned on, such that the inductor current reconstruction signal can be forced to be equal to the switching current sampling signal.

In interval X, switches K1 and K2 can be turned off and sample switch SL turned on, and the current flowing through rectifier transistor LS can participate in the form of the inductor current reconstruction signal in interval X. For example, the inductor current reconstruction signal can track the current flowing through rectifier transistor LS. That is, the inductor current reconstruction signal can track the switching current sampling signal.

As mentioned above, in one switching cycle, the inductor current reconstruction circuit can adjust the inductor current reconstruction signal according to the sample value of the current flowing through main power transistor HS and/or the sample value of the current flowing through rectifier transistor LS. Whether the current flowing through main power transistor HS and/or the sample value of the current flowing through rectifier transistor LS participates, the adjustment of the inductor current reconstruction signal can be determined by the relationship between the on-time corresponding to the transistor and the blanking time.

In particular embodiments, the inductor current can be tracked in the complete switching cycle by the switching current sample signal by obtaining the current representing the current the main power transistor or the current representing the current the rectifier transistor and the inductor voltage signal. In addition, a power converter may be provided, where the power converter can include any inductor current reconstruction circuit discussed herein. Further, the power converter can include the main power transistor, the rectifier transistor, and a control circuit. The control circuit can generate the control signal, in order to control the on and off states of the main power transistor and the rectifier transistor.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of inductor current reconstruction for a power converter, the method comprising:
   a) acquiring at least one of a current that represents a current flowing through a main power transistor, and a current that represents a current flowing through a rectifier transistor, in order to generate a switching current sampling signal in the power converter; and
   b) generating an inductor current reconstruction signal representing an inductor current in one complete switching cycle according to the switching current sampling signal and an inductor voltage signal representing a voltage across an inductor in the power converter,
   c) wherein a current tracking signal is generated according to the switching current sampling signal in a first time interval of a conduction time interval of a detected transistor when one of the main power transistor and the rectifier transistor is configured as the detected transistor, a current analog signal varying with the inductor current is generated according to the current tracking signal and the inductor voltage signal in at least part of an off-time interval of the detected transistor, the current tracking signal is continuous with the current analog signal, and both the current tracking signal and the current analog signal are configured as parts of the inductor current reconstruction signal.

2. The method of claim 1, wherein a first slope signal representing a change rate of the inductor current is obtained according to the current tracking signal in the generation of the current tracking signal.

3. The method of claim 2, wherein a second slope signal is obtained according to the first slope signal and a change of the voltage across the inductor when the detected transistor is operated in a conduction time interval and an off-time interval of the detected transistor.

4. The method of claim 3, wherein a ratio of the first slope signal to the second slope signal is proportional to a ratio of the inductor voltage signal in the conduction time interval to the inductor voltage signal in the off-time interval.

5. The method of claim 3, wherein:
   a) the current tracking signal is not generated in a second time interval of the conductive time interval of the detected transistor; and
   b) the second time interval of the conductive time interval of the detected transistor comprises the turn-on moment of the detected transistor.

6. The method of claim 5, wherein the current analog signal is generated in the second time interval of the conduction time interval of the detected transistor.

7. The method of claim 5, wherein the current analog signal is generated in a remaining time interval of the switching cycle excluding the first time interval of the detected transistor in one switching cycle according to the current tracking signal and the inductor voltage signal.

8. The method of claim 7, wherein the current analog signal is generated in the off-time interval of the detected transistor according to the current tracking signal and the second slope signal.

9. The method of claim 8, wherein the current analog signal in the off-time interval of the detected transistor is generated by changing the value of the current tracking signal at an end moment of the first time interval of the detected transistor with the second slope signal.

10. The method of claim 9, wherein the current analog signal in the second time interval of the conduction time interval is generated by changing the value of the current tracking signal at an end moment of the off-time interval of the detected transistor with the first slope signal.

11. The method of claim 7, wherein the switching current sampling signal is obtained by detecting one of the main power transistor and the rectifier transistor.

12. The method of claim 7, wherein:
   a) the switching current sampling signal is obtained by detecting the main power transistor and the rectifier transistor; and b) the conduction time interval of one of the main power transistor and the rectifier transistor is less than the time length of the second time interval of the conduction time interval.

13. The method of claim 5, wherein the current analog signal is generated in a time interval with a same time length as the second time interval of the detected transistor immediately after the first time interval of the detected transistor.

14. The method of claim 13, wherein:
a) the switching current sampling signal is obtained by detecting the main power transistor and the rectifier transistor; and
b) both the conduction time intervals of the main power transistor and the rectifier transistor are greater than the time length of the second time interval.

15. The method of claim 14, wherein one switching cycle of the inductor current reconstruction signal comprises:
a) the current tracking signal in the first time interval of the conduction time interval of a first transistor that is one of the main power transistor and the rectifier transistor;
b) the current analog signal in the second time interval of a second transistor that is the other one of the main power transistor and the rectifier transistor, continuous with the first time interval of the conduction time interval of the first transistor;
c) the current tracking signal in the first time interval of the conduction time interval of the second transistor; and
d) the current analog signal in the second time interval of the first transistor continuous with the first time interval of the conduction time interval of the second transistor.

16. The method of claim 3, wherein the generating the current tracking signal comprises:
a) tracking the inductor current in real time, in order to control the current tracking signal to be proportional to the inductor current in the first part of the first time interval; and
b) adjusting a change rate of the current tracking signal, in order to track a change rate of the inductor current to obtain the first slope signal in the second part of the first time interval.

17. The method of claim 16, wherein:
a) in the second part of the first time interval, the current tracking signal and the first slope signal are obtained by charging and discharging a capacitor through a controllable current source;
b) the output current of the controllable current source is adjusted according to the error between the switching current sampling signal in real time and the current tracking signal, in order to control the current tracking signal to be consistent with the switching current sampling signal; and
c) the output current of the controlled current source represents the first slope signal.

18. The method of claim 17, wherein the change trend of the output current of the controlled current source matches that of the inductor voltage signal.

19. An inductor current reconstruction circuit for a power converter, the inductor current reconstruction circuit comprising:
a) a switching current sampling circuit configured to acquire at least one of a current that represents a current flowing through a main power transistor and a current that represents a current flowing through a rectifier transistor, in order to generate a switching current sampling signal in the power converter; and
b) an inductor current generation circuit configured to generate an inductor current reconstruction signal representing an inductor current in one complete switching cycle according to the switching current sampling signal and an inductor voltage signal representing a voltage across an inductor in the power converter,
c) wherein a current tracking signal is generated according to the switching current sampling signal in a first time interval of a conduction time interval of a detected transistor when one of the main power transistor and the rectifier transistor is configured as the detected transistor, a current analog signal varying with the inductor current is generated according to the current tracking signal and the inductor voltage signal in at least part of an off-time interval of the detected transistor, the current tracking signal is continuous with the current analog signal, and both the current tracking signal and the current analog signal are configured as parts of the inductor current reconstruction signal.

20. The inductor current reconstruction circuit of claim 19, wherein a first slope signal representing a change rate of the inductor current is obtained according to the current tracking signal in the generation of the current tracking signal.

* * * * *